United States Patent [19]

Madaus et al.

[11] 4,053,568

[45] Oct. 11, 1977

[54] PROCESS FOR THE PREPARATION OF ANTACID ALUMINUM HYDROXYCARBONATE HYDRATE

[75] Inventors: Rolf Hermann Heinrich Madaus, Cologne-Bruck; Klaus Gorler, Bensberg-Refrath, both of Germany

[73] Assignee: Dr. Madaus & Co., Cologne, Germany

[21] Appl. No.: 563,416

[22] Filed: Mar. 28, 1975

[30] Foreign Application Priority Data

May 4, 1974   Germany ............................ 2421703

[51] Int. Cl.$^2$ .................... C01B 31/24; A01N 11/00; A61K 33/10; C01F 7/02
[52] U.S. Cl. .................... 423/419 P; 423/427; 423/630; 424/156; 424/157
[58] Field of Search ............ 423/419, 420, 421, 422, 423/428, 430, 625, 628, 629; 424/154, 158, 156, 157

[56] References Cited

U.S. PATENT DOCUMENTS

| | | | |
|---|---|---|---|
| 2,137,638 | 11/1938 | Soudern et al. ........................ 424/157 |
| 2,783,124 | 2/1967 | Grote ................... 423/420 |
| 2,783,127 | 2/1957 | Grote ................... 423/428 |
| 2,783,179 | 2/1957 | Grote ................... 423/419 |
| 2,797,978 | 7/1957 | Beekman ............... 423/419 |
| 2,958,626 | 11/1960 | Schenck et al. ...... 423/430 |
| 3,115,387 | 12/1963 | Lewin ................... 423/422 |
| 3,501,264 | 3/1970 | Pilato ................... 423/628 |
| 3,773,918 | 11/1973 | Beekman .............. 423/629 |
| 3,911,090 | 10/1975 | Hem et al. .......... 423/427 X |

FOREIGN PATENT DOCUMENTS 1,921,999   11/1970   Germany ........................... 423/629

*Primary Examiner*—O. R. Vertiz
*Assistant Examiner*—Gary P. Straub
*Attorney, Agent, or Firm*—Burgess, Dinklage & Sprung

[57] ABSTRACT

A basic aluminum hydroxycarbonate hydrate, usable as an antacid, is prepared by simultaneously adding aqueous solutions of aluminum sulfate and alkali hydrogen carbonate or alkali carbonate to water while maintaining a neutral or weakly alkaline pH and adjusting the pH-value of the reaction mixture, after completed precipitation, to about 6.0 by adding an aluminum salt of a strong acid.

17 Claims, 2 Drawing Figures

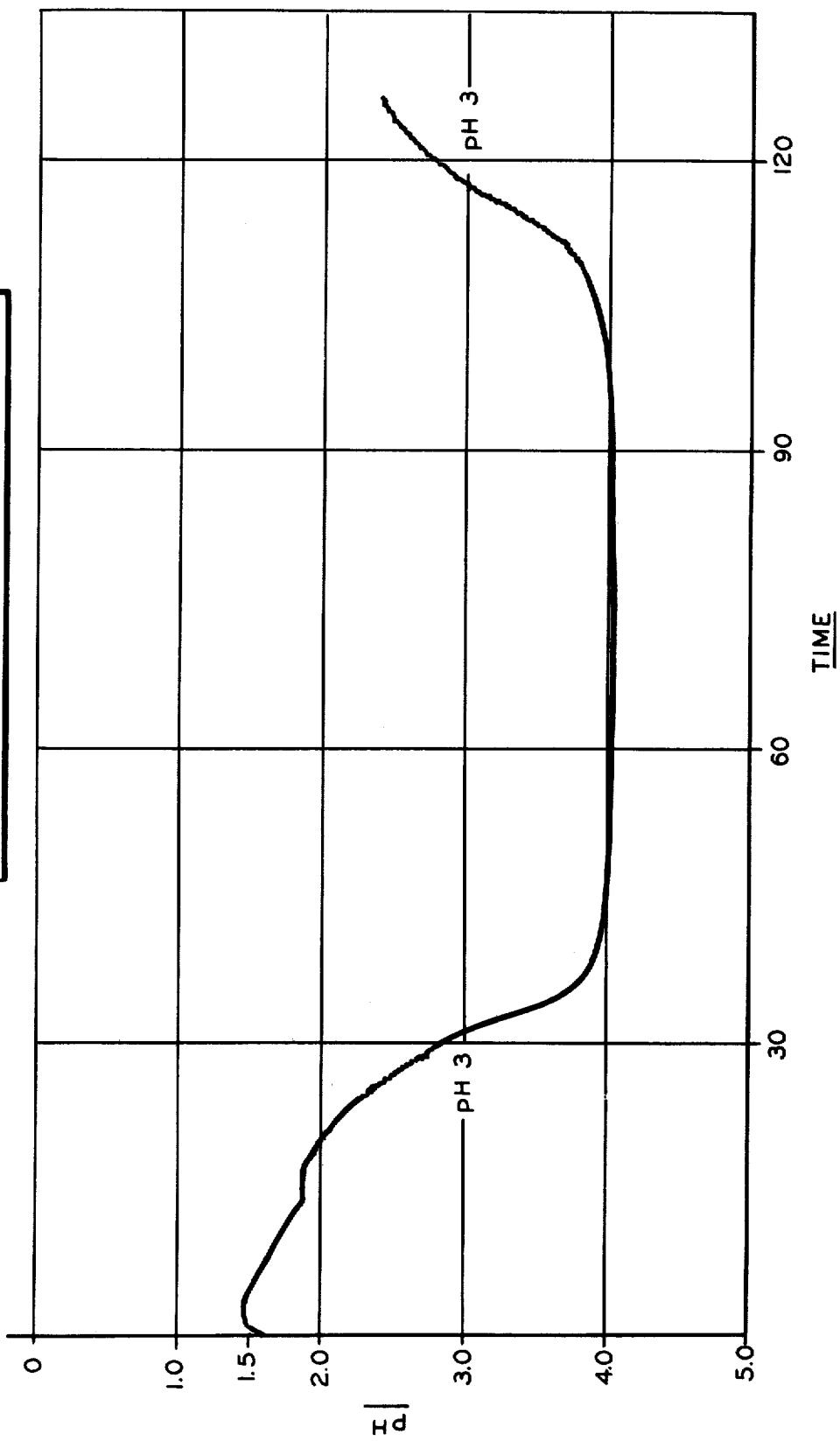

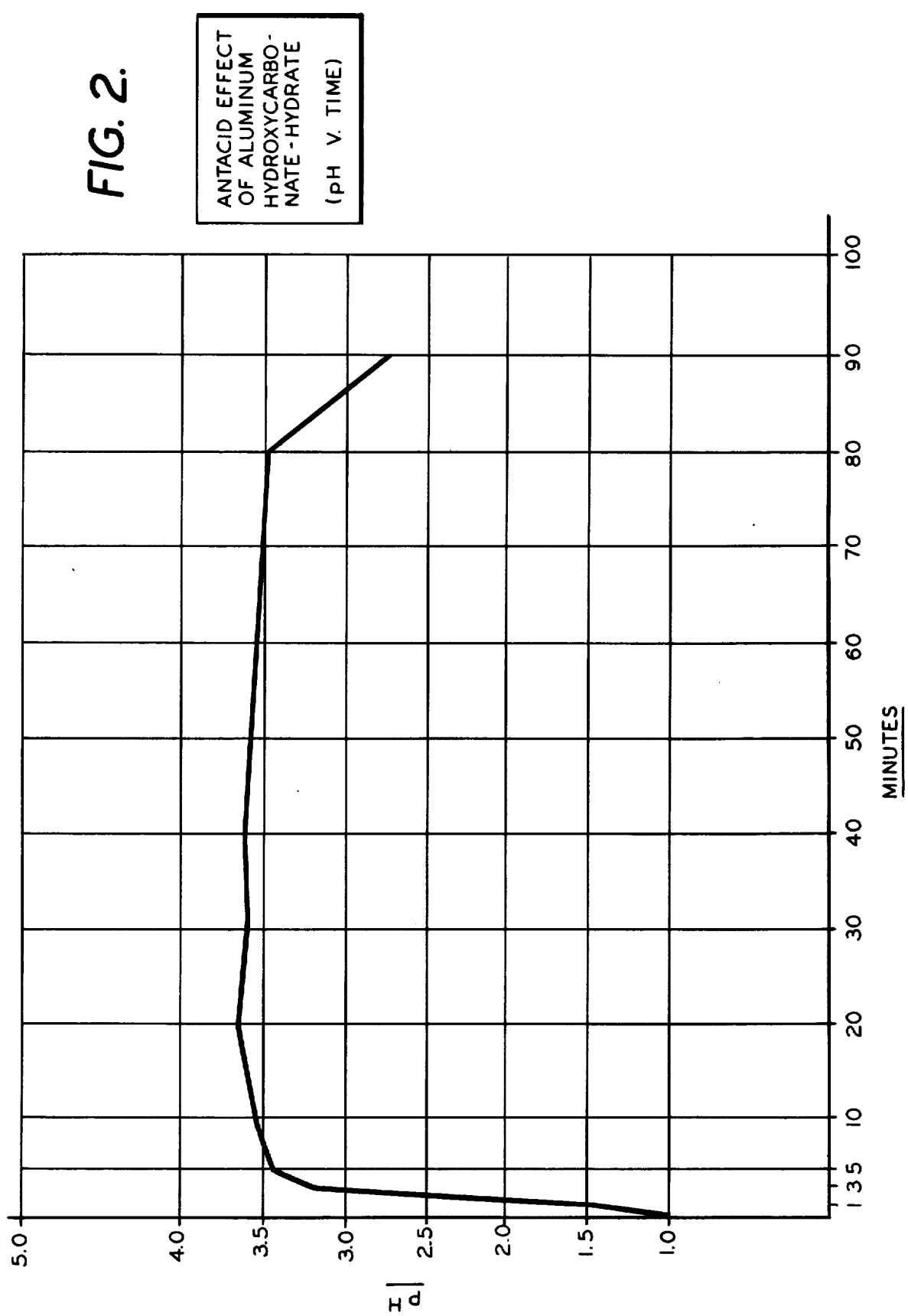

PROCESS FOR THE PREPARATION OF ANTACID ALUMINUM HYDROXYCARBONATE HYDRATE

The invention relates to a method for the preparation of a basic aluminum hydroxycarbonate hydrate which is suitable for use as an antacid, i.e., for the neutralization of stomach acid.

A known aluminum hydroxide gel, usable as an antacid, is produced by simultaneously adding two aqueous solutions of aluminum sulfate and sodium hydrogen carbonate and/or sodium carbonate to water or to an electrolytic solution, at a pH of 6 to 8, with subsequent filtering, washing and drying of the obtained precipitate. It is the objective of this known method to use the cheaper aluminum sulfate for the precipitation instead of the expensive aluminum chloride and aluminum nitrate.

It has now become evident that, when the basic aluminum hydroxycarbonate hydrate precipitates during such a reaction of aluminum sulfate with alkali hydrogen carbonate and/or alkali carbonate, it is subject to a strong alkaline after-reaction during precipitation, despite adhering to a pH-value of 7 to 8, due to which the pH-value of the reaction mixture gradually increases to about pH 9 to 10 after precipitation. Such a strong alkaline pH-value, however, makes the precipitate unsuitable for the use as an antacid, since it is incompatible with the physiological conditions of the stomach. In this connection it must also be taken into consideration that the pH-value of the precipitate when preparing same further for the actual antacid preparation, which is present as gel in the galenic preparation, normally increases further due to the very fine particle distribution. Thus, a gel produced from an aluminum oxycarbonate hydrate of a pH-value of 9 will have a pH of 10 to 11.

It has now been discovered that this undesired after-reaction and pH-value increase of the precipitated basic aluminum hydroxycarbonate hydrate can be prevented if the reaction mixture, after completion of precipitation, is adjusted to a pH of 5.5 to 6.5, preferably of 6.0, with an acidic aluminum slat, i.e. a salt which acts as an acid in aqueous solution due to hydrolysis. Suitable are for instance salts of strong acids, such as aluminum chloride, aluminum nitrate and/or aluminum sulfate.

It has furthermore been discovered that the precipitate can be particularly well purified by washing away side products after an aging period of at leasst 12 hours, preferably however 15 hours, after adjusting the reaction mixture to the pH-value of about 6.0. The antacid effectiveness of the product prepared according to the invention lies above the effectiveness of the aluminum hydroxides and aluminum hydroxycarbonates known according to the state of the art.

Thus, the invention comprises a method for the preparation of basic aluminum hydroxycarbonate hydrate comprising simultaneous addition of aqueous solutions of aluminum sulfate and alkali hydrogen carbonate and/or alkali carbonate to water while maintaining a neutral or weakly alkaline pH-value and with stirring, and adjusting, after complete precipitation, the pH-value of the solution to about 6 utilizing an aqueous solution of at least one aluminum salt of a strong acid. Accordingly, to avoid the after-reaction and the concomitant raising of the pH to 10 or 11, the reaction product is adjusted after complete precipitation with an aqueous solution of aluminum salts of strong acids to a pH-value of about 6. This adjusted pH-value should then continue to remain constant for at least 2 hours and may not increase substantially over a period of about 15 hours, i.e., it should not be permitted to rise substantially over pH 7 over the 15 hour aging period.

The precipitation of the basic aluminum hydroxycarbonate hydrate by reacting aluminum sulfate with alkali hydrogen carbonate and/or alkali carbonate may be done at room temperature but is preferably carried out below room temperature, viz., at about 16° to 18° C.

Sodium hydrogen carbonate is preferred as alkali hydrogen carbonate. The mole ratio of aluminum sulfate to alkali hydrogen carbonate may be from 1:2 to 1:3.5. Preferred, however, is a mole ratio of 1:2.5.

During the precipitation, and while stirring vigorously, the pH-value of the reaction solution is kept in the neutral to weakly alkaline range (pH 6.8 – 7.8, preferably 7.0 – 7.3).

After completion of the precipitation and adjustment of the alkaline reaction mixture with, e.g., aluminum chloride solutio, to a pH-value of about 6.0, and after letting it stand for at least 12 hours, preferably 15 hours, the precipitate is conveniently filtered off, throughly wahsed with water and subsequently freed of water with a water-miscible organic liquid, e.g., alcohols such as ethanol, and then separated from the liquid in a suitable manner, for instance by centrifuge, and dried in a vacuum at slightly elevated temperatures.

The basic aluminum hydroxycarbonate hydrate obtained in this manner is easily soluble in 1/10 N mineral acid. The aluminum content calculated as $Al_2O_3$ is 49.1 to 58.6% and the $CO_2$ content is between 6 and 8%. A product with such a $CO_2$ content is particularly favorable for the use an an antacid, because below 4% $CO_2$ there is only little antacid effect, and products with a higher $CO_2$ content, of for example 12% and more, are not stable and are too alkaline.

The aluminum hydroxycarbonate hydrate according to the invention, when subjected to a standard secretion test with artificial stomach acid, results in a rating of 90 min/50 mg of dry substance, i.e., the time between pH 3.0 (increasing) and pH 3.0 (decreasing) is 90 minutes as shown in FIG. 1 hereof, which is a plot of the Ph of the treated secretion acid over time. The antacid effectiveness measured by the Schaub-test is 85 min/1 g dry substance, whereby 370 ml artificial stomach acid of pH 1.5 are neutralized. This is shown in FIG. 2. During the duration of the antacid effect, the proteolytic activity of the stomach enzymes (pepsin) decreases below 10 % of the normal value.

An aqueous suspension of the aluminum hydroxycarbonate hydrate of the invention has a pH-value of 7.8; in 15 % concentration in a gel the pH is 7.5 – 7.7 The product is free of sulfate and chloride ions and, overall, the product thus meets the requirements demanded of an effective antacid.

The following examples are illustrative of the preparation of the aluminum hydroxycarbonate hydrate of the invention:

EXAMPLE 1

130.0 kg of commercial grade aluminum sulfate (containing 18 kg of water as water of hydration) are dissolved in 1,000 liters tap water (Solution 1)

280.0 kg of commerical grade sodium hydrogen carbonate are dissolved in 3,000 liters tap water (Solution 2)

Solutions 1 and 2 were mixed together with the addition of 1,000 liters tap water while stirring vigorously, and maintaining a temperature of 16° – 18° C and adhering to a pH-value of 7.0 – 7.3. The feed rate of reactants was 4,000 liters/hour. The reaction product precipitated immediately in granular form. After precipitation was completed, a 5% aluminum chloride solution was added over a period of one hour to the precipitated reaction product until a pH-value of 6.0 was reached. After a holding period of 15 hours, the precipitate was filtered and washed until the washed filtrate no longer showed any appreciable reaction to sulfate and chloride. Thereafter, the washed precipitate was suspended in sufficient ethanol to be easily stirred. After a treatment period of 30 minutes, the product was vigorously centrifuged to remove water and dried between 40° – 50° C in vacuo at 1 to 2 mm/Hg.

EXAMPLE 2

130.0 kg commercial grade aluminum sulfate (containing) 18 kg of water as water of hydration) are dissolved in 1,000 liters tap water (Solution 1)

280.0 kg commercial grade sodium hydrogen carbonate are dissolved in 3,000 liters tap water (Solution 2) Solutions 1 and 2 were mixed together with the addition of 1,000 liters tap water while stirring vigorously, and maintaining a temperature of 16° – 18° C and adhering to a pH-value of 7.0 to 7.3. The feed rate of reactants was 4,000 liters/hour. The reaction product precipitated immediately in granular form. After the precipitation was completed, aluminum sulfate solution of the same concentration as Solution 1, above, was added over a period of one hour to the precipitated reaction product until a pH-value of 6.0 was reached. After a holding period of 15 hours, the precipitate was filtered and washed until the washed filtrate no longer showed any appreciable reaction to sulfate. Thereafter, the washed precipitate was suspended in sufficient ethanol to be easily stirred. After a treatment period of 30 minutes, the product was vigorously centrifuged to remove water and dried between 40° to 50° in vacuo at 1 to 2 mm/hg.

It will be understood that the foregoing specification and examples are illustrative but not limitative of the present invention inasmuch as other embodiments within the spirit and scope of the invention will suggest themselves to those skilled in the art.

What is claimed is:

1. Process for the preparation of basic aluminum hydroxycarbonate hydrate which comprises simultaneously adding aqueous solutions of aluminum sulfate and alkali metal hydrogen carbonate or carbonate to water while maintaining an initial pH-value of from 6.8 to 7.8, permitting the resulting precipitation to run to completion, and then in a subsequent step, adding an aluminum salt of a strong acid to adjust the pH-value of the reaction mixture to about 6.0.

2. Process as claimed in claim 1 wherein the addition of said aqueous solutions to water and the resulting precipitation is carried out at room temperature.

3. Process as claimed in claim 1 wherein the addition of said aqueous solutions to water and the resulting precipitation is carried out at below room temperature.

4. Process as claimed in claim 3 wherein the temperature is 16 to 18° C.

5. Process as claimed in claim 1 wherein the mole ratio of aluminum sulfate to alkali hydrogen carbonate is 1:2 to 1:3.5.

6. Process as claimed in claim 5 wherein said mole ratio is 1:2.5.

7. Process as claimed in claim 1 wherein said reaction mixture to which the aluminum salt has been added is maintained for a holding period of at least about 12 hours.

8. Process as claimed in claim 7 wherein said holding period is about 15 hours.

9. Process as claimed in claim 1 wherein said reaction mixture with the aluminum salt added thereto is filtered and the precipitate freed of water by contacting it with a water soluble alcohol.

10. Process as claimed in claim 9 wherein said water-miscible organic liquid is ethanol.

11. Process as claimed in claim 10 wherein said water-free precipitate is dried in a vacuum at a temperature of about 40° to 50° C.

12. Process as claimed in claim 1 wherein the alkali metal hydrogen carbonate or carbonate solution is a sodium hydrogen carbonate solution.

13. Process as claimed in claim 1 wherein the alkali metal hydrogen carbonate solution is a sodium carbonate solution.

14. Process as claimed in claim 1 wherein said aluminum salt of a strong acid is aluminum chloride.

15. Process as claimed in claim 1 wherein said aluminum salt of a strong acid is aluminum nitrate.

16. Process as claimed in claim 1 wherein said aluminum salt of a strong acid is aluminum sulfate.

17. Process as claimed in claim 1 wherein said initial pH-value is from 7.0 to 7.3.

* * * * *